United States Patent [19]

Schön et al.

[11] 4,301,005
[45] Nov. 17, 1981

[54] APPARATUS FOR FILTERING A LIQUID

[75] Inventors: Otmar P. Schön, Saarbrücken-Scheidt; Manfred Klauck, Lebach, both of Fed. Rep. of Germany

[73] Assignee: Flutec Fluidtechnische Geräte GmbH, Sulzbach, Fed. Rep. of Germany

[21] Appl. No.: 161,293

[22] Filed: Jun. 20, 1980

[30] Foreign Application Priority Data

Jun. 23, 1979 [DE] Fed. Rep. of Germany ... 7918117[U]

[51] Int. Cl.³ ............................................. B01D 29/02
[52] U.S. Cl. ..................................... 210/90; 210/130; 210/238; 210/241; 210/249
[58] Field of Search ............... 210/130, 167, 168, 238, 210/232, 249, 241, 416 L, 470, 471, 90

[56] References Cited

U.S. PATENT DOCUMENTS

| 2,007,068 | 7/1935 | Beck | 210/249 |
| 2,071,483 | 2/1937 | Winslow | 210/168 |
| 2,286,816 | 6/1942 | Kishline | 210/168 |
| 2,589,136 | 3/1952 | Ralston | 210/249 |
| 2,647,633 | 8/1933 | Greene | 210/249 |
| 2,678,134 | 5/1954 | Middleton | 210/168 |
| 2,706,905 | 4/1955 | Wilson | 210/168 |
| 2,803,384 | 8/1957 | Korte | 210/249 |
| 3,002,624 | 10/1961 | Vettel | 210/167 |
| 3,050,189 | 8/1962 | Willians | 210/232 |

Primary Examiner—Ernest G. Therkorn
Attorney, Agent, or Firm—Roylance, Abrams, Berdo & Farley

[57] ABSTRACT

A portable apparatus for filtering a liquid including a replaceable filter and a pump. A unitary connecting piece in the apparatus has a series of channels in the form of bores for connecting a suction inlet with the suction side of the pump, for connecting the pressure side of the pump with the filter housing and for connecting the filter element with a pressure outlet.

7 Claims, 9 Drawing Figures

U.S. Patent    Nov. 17, 1981    Sheet 2 of 3    4,301,005
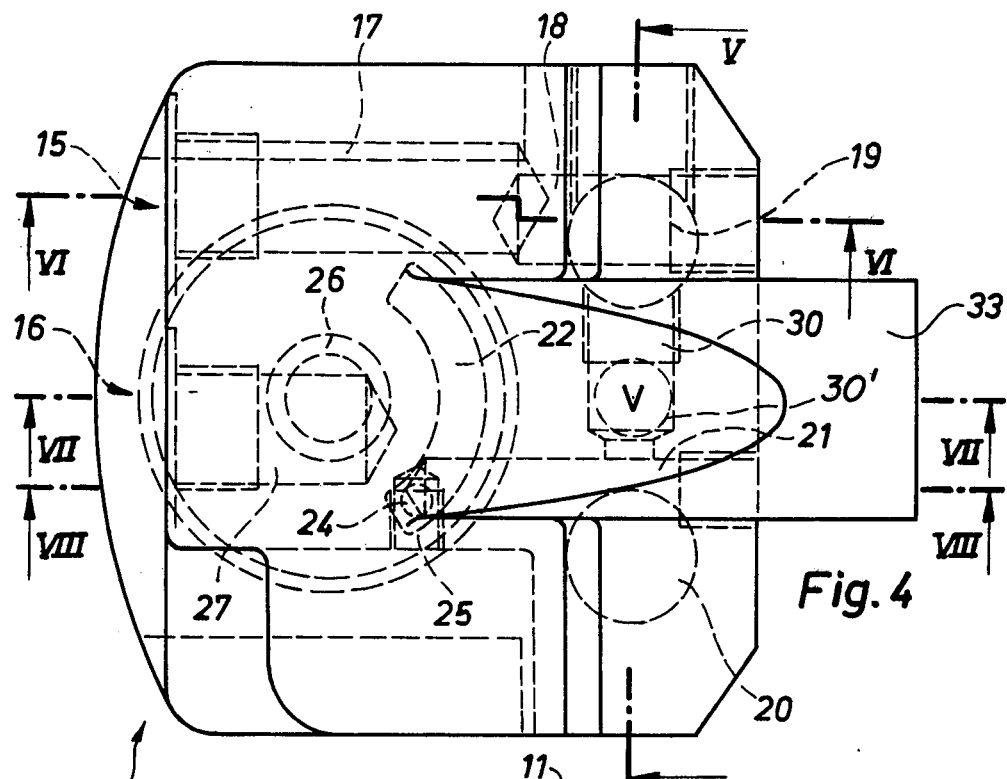
Fig. 4
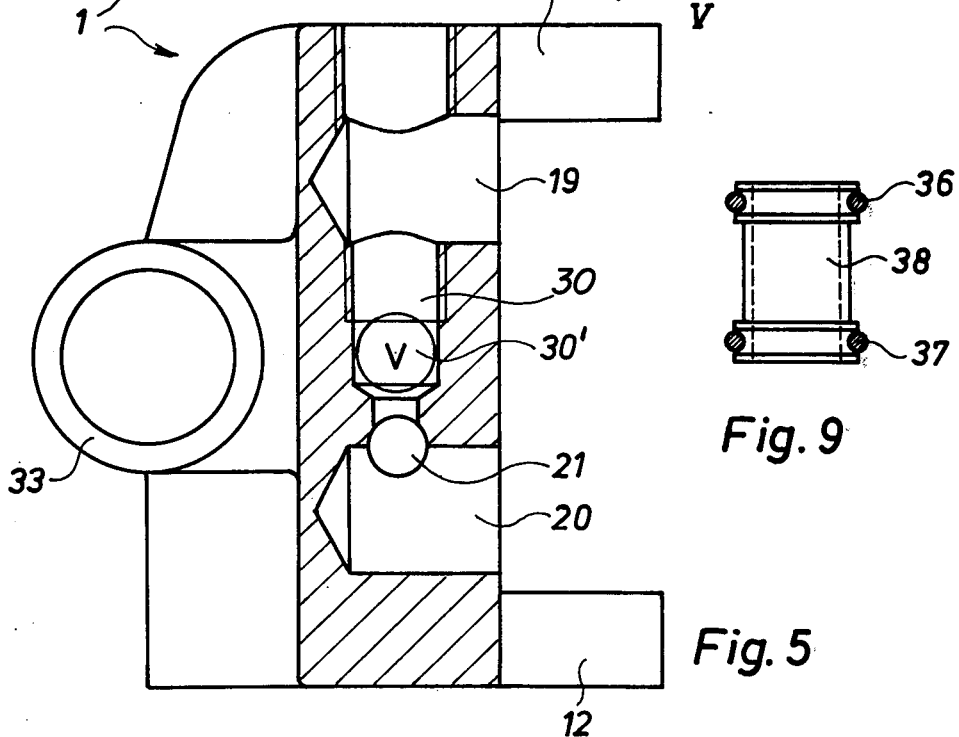
Fig. 5
Fig. 9

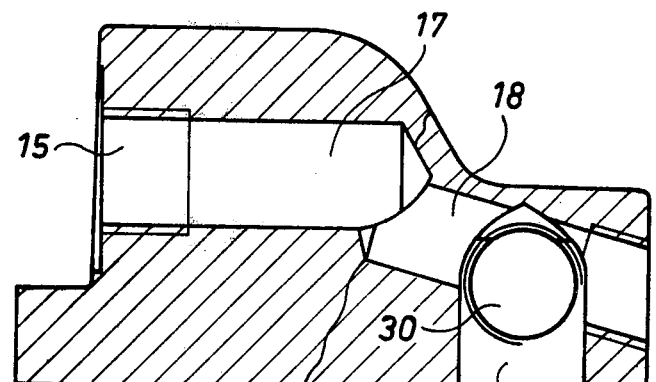
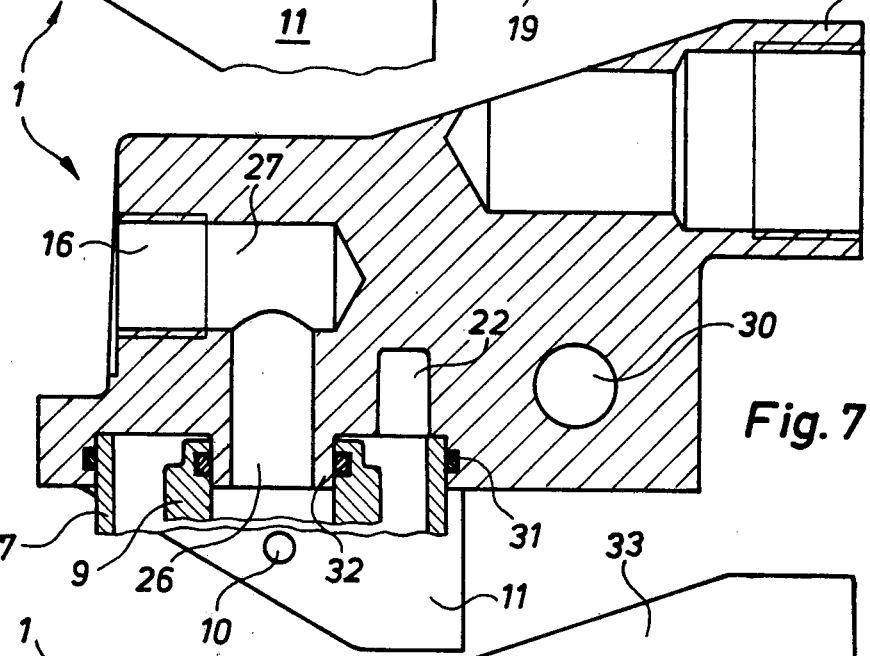
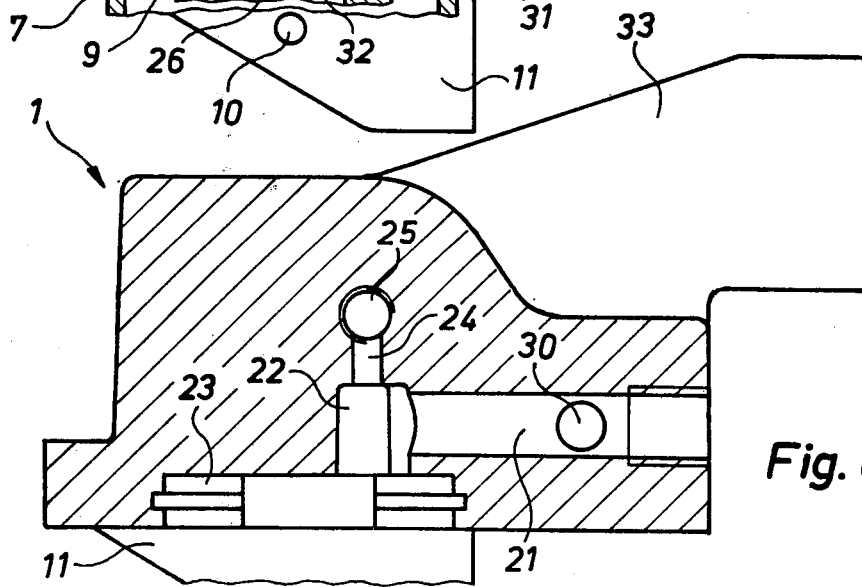

APPARATUS FOR FILTERING A LIQUID

FIELD OF THE INVENTION

The invention relates to a portable filtering apparatus for a liquid, such as hydraulic oil. The apparatus includes an electric pump for the liquid, an easily replaceable filter, and a unitary connecting piece having bores therein for conducting the liquid therethrough.

BACKGROUND OF THE INVENTION

Devices are known for filtering liquids, such as hydraulic oil, as the liquid moves from a supply tank along a conduit. However, many of these filtering apparatus take up large amounts of space and are extremely complicated in construction. Moreover, many of these prior art devices are not easily moved from place to place.

SUMMARY OF THE INVENTION

Accordingly, it is a primary object of the present invention to provide an easily portable apparatus for filtering a liquid.

Another object of the present invention is to provide such an apparatus which is simply constructed utilizing a unitary central piece of material to conduct a liquid therethrough.

Another object of the present invention is to provide such an apparatus which takes up a small amount of space.

The foregoing objects are basically attained by providing an apparatus for filtering a liquid including a filter housing carrying a filter element and a pump driven by a motor, the improvement comprising a unitary connecting piece having a suction inlet and a pressure outlet, the filter housing and the pump being coupled to said connecting piece; and channel means formed in the connecting piece for connecting the suction inlet with the suction side of the pump, for connecting the pressure side of the pump with the filter housing and for connecting the filter element with the pressure outlet.

More specifically, the unitary connecting piece has a plurality of bores formed therein to act as the channel means for the liquid passing therethrough.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this original disclosure:

FIG. 4 is an enlarged top view in partial section of the apparatus;

FIGS. 5-8 each shows a sectional view, respectively, along lines V—V, VI—VI, VII—VII and VIII—VIII in FIG. 4; and FIG. 9 is side view of a length of pipe used in the apparatus.

DETAILED DESCRIPTION OF THE INVENTION

Figure 1:
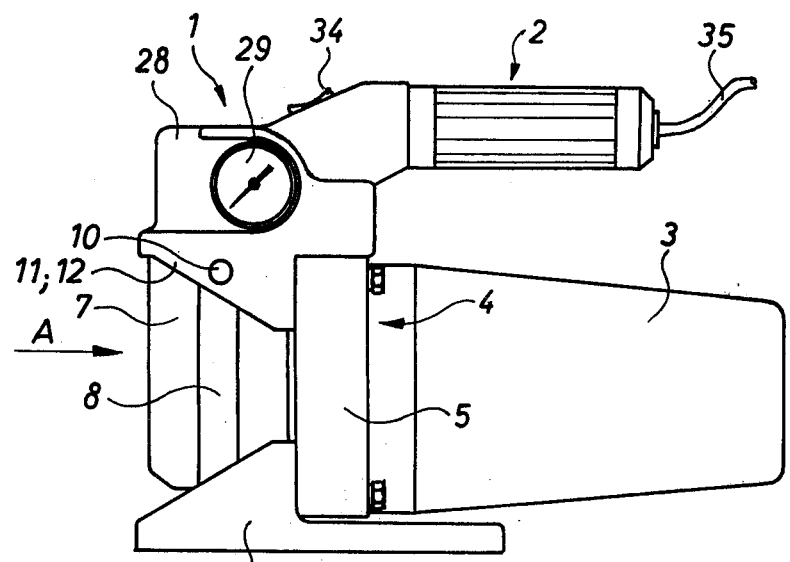
FIG. 1 is a side view of the apparatus in accordance with the present invention.
Figure 2:
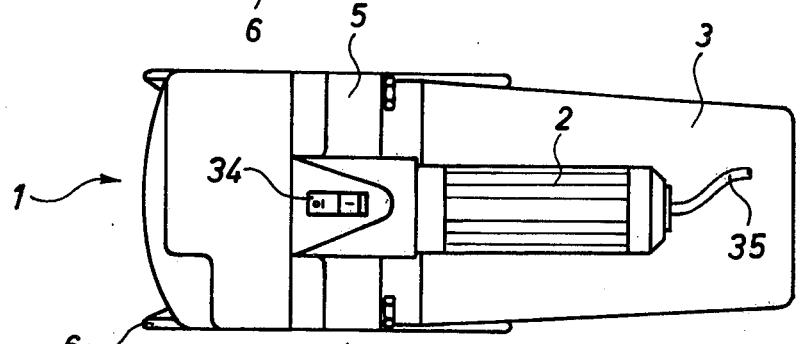
FIG. 2 is a top view of the apparatus.

As seen in FIG. 1, a unitary connecting piece 1, which is centrally located in the apparatus, has coupled to its top side a handle 2 projecting from one side thereof. A driving motor 3, which has its axis parallel to the axis of handle 2, is connected to a booster pump 4 below handle 2. A pump housing 5 carries the booster pump 4 and is coupled to the underside of the connecting piece 1.

On the underside of the pump housing 5, a support leg 6 is rigidly coupled, the support leg extending past the pump housing 5, the booster pump 4 and under a part of the driving motor 3. Between the connecting piece 1 and the support leg 6, a filter housing 7 is located, which housing is coupled to the connecting piece by means of a holding stirrup 8. The filter housing 7 consists of a transparent enclosure, formed for example from plastic, and contains the filter element 9, as seen in FIG. 3.

Figure 3:
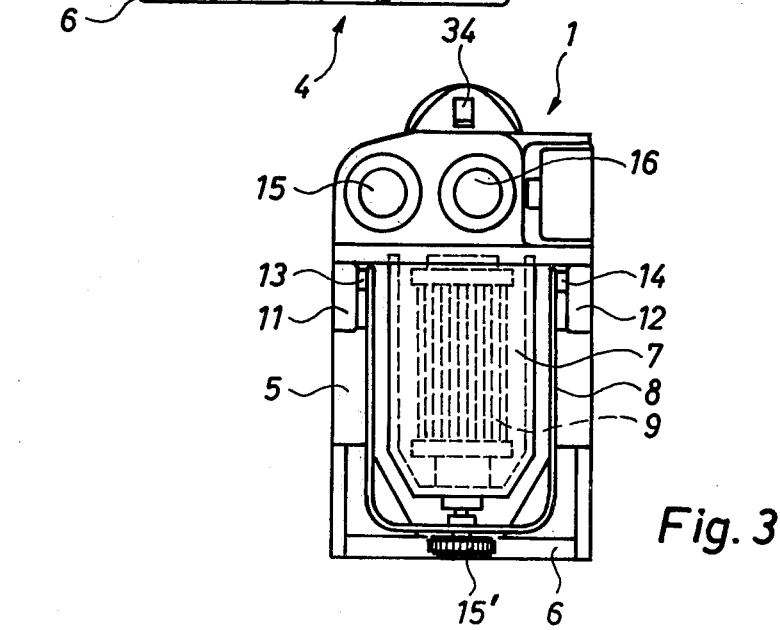
FIG. 3 is a view of the apparatus in the direction of the arrow A in FIG. 1.

As seen in FIG. 3, on the underside of the connecting piece 1, a pair of opposed jaws 11 and 12 extend laterally, each having a lateral bearing bore 10 therein. The holding stirrup 8 is formed in a U-shaped configuration and at the end of its legs it carries bearing pins 13 and 14 fitting into the bearing bores 10 in jaws 11 and 12. In the central part of the holding stirrup 8, a clamping screw 15', which can be released by hand, is threadedly attached and serves to hold the filter housing 7 on the connecting piece 1. After release of the clamping screw, the holding stirrup can be pivoted away from the pump housing 5 and the filter housing 7, together with the filter element 9, can be released from the connecting piece 1.

The internal configuration of the connecting piece 1 is shown in more detail in FIGS. 4-8. The connecting piece 1 has two threaded connections 15 and 16 to be coupled to threaded conduits for the liquid to be filtered. Connection 15 is a suction connection or inlet which allows liquid to enter the connecting piece, while connection 16 is a pressure connection or outlet which allows the filtered liquid to exit from the connecting piece 1.

The suction inlet 15 is connected by way of two blind bores 17 and 18 formed in the connecting piece 1 with a suction bore 19. As seen in FIG. 6, the blind bore 18 is closed towards the outside. In parallel relationship to the suction bore 19 and displaced laterally thereto, there is a pressure bore 20, as seen in FIGS. 4 and 5, in the connecting piece 1, which is connected with an arc-shaped groove 22 by means of a blind bore 21 closed on the side adjacent the handle 2.

The arc-shaped groove 22 leads to an annular groove 23, as seen in FIGS. 7 and 8, which is open in the downward direction.

The groove 22, on its side facing away from the annular groove 23, is connected by way of a blind bore 24 with a transverse bore 25 leading to the outside of the connecting piece 1. Coaxially to the annular groove 22, an outlet bore 26 is formed as a blind bore which is connected with the blind bore 27, which is in turn connected with the pressure outlet 16 and which connection is at right angles thereto. The transverse bore 25 leads into a trough 28, open on one side and placed on the outside of the connecting piece 1, which serves to receive a manometer 29, as seen in FIG. 1.

The suction bore 19 and the pressure 20 are interconnected by means of a stepped connecting bore 30, which is intended to receive an excess pressure one-way valve 30', which opens from the pressure bore 20 to the suction bore 19.

The annular groove 23 receives the upper edge of the filter housing 7 and of a gasket. The outlet bore 26 in the area of its mouth is surrounded by a connecting member 32, which is surrounded by the annular groove 23. This provides for slipping on filter element 9. The gap between the connecting member 32 and the filter element 9 is sealed by means of an O-ring 31.

The handle is screwed into a hollow connecting part 33 which lies on the side of the connecting piece 1 facing away from the inlet and outlet 15 and 16. A switch 34, which is operable manually, is located in the connecting part 33, which switch serves to connect or disconnect the driving motor 3 with an electric line 35 connected with a power source, not shown. The hollow handle 2 can receive a capacitor therein for the driving motor which can be an A.C. motor. Instead of such a motor one may also use a low voltage D.C. motor.

The piece of pipe 38, shown in FIG. 9, which at both ends has annular grooves for the reception of sealing rings 36 and 37, connects the suction bore 19 with a corresponding line leading to the suction side of the booster pump 4. An identical piece of pipe is provided for the connection of the pressure bore 20 with a line leading to the pressure side of the booster pump 4, which has corresponding suction and pressure connections.

The previously described apparatus is especially useful in a shunt for filtering liquids, especially hydraulic oil. The suction inlet 15 is connected by means of a conduit, not shown, with for example a supply tank of liquid to be filtered and pumped. From this supply tank, the liquid is sucked in by the booster pump 4 via the suction inlet 15, the connecting blind bores 17 and 18, the suction bore 19 and the suction side of the booster pump 4. The sucked in liquid is forced from the pressure side of the booster pump 4 and by the latter into the filter housing 7 by way of the pressure bore 20, the blind bore 21 and the two grooves 22 and 23. The liquid, being under pressure, then flows through the filter element 9 from the outside to the inside and enters into, for example, the supply tank, by way of the hollow middle of the filter, the outlet bore 26, the blind bore 27 and the pressure outlet 16.

The degree of pollution of the filter element 9 is indicated by the manometer 29 which is connected with the groove 22 by way of the blind bore 24 and the transverse bore 25. Whenever the pressure in bore 20 exceeds a predetermined value because of a very high degree of fouling of the filter element 9, then the excess pressure valve, housed in the connecting channel 30, opens to the suction bore 19 and thus establishes a connection between the pressure side and the suction side of the booster pump 4.

The previously described apparatus may be carried by hand and may therefore be used in a very simple manner. The pressure flow of the liquid may be observed in the transparent filter housing 7. To replace the filter element 9, the holding stirrup is pivoted away from the leg 6 so that the filter housing 7 may be pulled off the connecting piece 1 and the filter element 9 thereby becomes accessible. The latter therefore may be easily replaced.

Whenever the filter element 9 is removed from the filter housing 7, then the apparatus may also be used to suck away strongly fouled liquids, whereby the permissable degree of fouling depends upon the type of booster pump 4 utilized.

While one advantageous embodiment has been choosen to illustrate the invention, it will be understood by those skilled in the art that various changes and modifications can be made therein without departing from the scope of the invention as defined in the appended claims.

What is claimed is:

1. An apparatus for filtering a liquid including a pot-shaped filter housing (7) carrying a filter element (9) and a pump (4) driven by a motor (3), the improvement comprising:
    a unitary connecting piece (1) having on its front side a suction inlet (15) and a pressure outlet (16), the filter housing (7) and the pump (4) being coupled to the bottom side of said connecting piece (1);
    channel means, formed in said connecting piece (1), including a first channel (17, 18, 19) for connecting said suction inlet (15) with the suction side of the pump (4), a second channel (20, 21, 22) for connecting the pressure side of the pump with the filter housing (7) and a third channel (26, 27) for connecting the middle of the filter element with said pressure outlet (16);
    said first channel (17, 18, 19) comprising two interconnecting blind bores (17, 18);
    said second channel (20, 21, 22) comprising two interconnecting and intersecting blind bores (20, 21);
    said third channel (26, 27) comprising two interconnecting and intersecting blind bores (26, 27);
    a connecting bore (30) formed in said connecting piece between said first channel on the suction side of the pump (4) and said second channel on the pressure side of the pump (4), said connecting bore (30) having a valve (30') therein opening to the suction side of the pump (4);
    means (8, 15'), pivotally coupled to said connecting piece (1), for releasably coupling the filter element (9) and the filter housing (7) to said connecting piece (1);
    a carrying handle (2) coupled to the top side of said connecting piece (1), said handle (2) being coupled to an electric cable (35); and
    a support leg (6) coupled below said connecting piece (1) and the filter housing (7) to the pump (4).
2. An apparatus according to claim 1 wherein said means for releasably coupling comprises a holding stirrup pivotally coupled to said connecting piece and having a portion located below the filter housing.
3. An apparatus according to claim 1, wherein said handle is hollow and thereby adapted to receive a capacitor therein.
4. An apparatus according to claim 1, wherein a manometer is coupled to said connecting piece and to the pressure side of the pump.
5. An apparatus according to claim 1, wherein said first and second channels have portions (19, 20) opening on the bottom side of said connecting piece.
6. An apparatus according to claim 1, wherein said first channel has a portion (17) formed as a blind bore in the front side of said connecting piece and another portion (19) formed as a blind bore in the rear side of said connecting piece.
7. An apparatus according to claim 1, wherein said second channel has a portion (21) formed as a blind bore in the rear side of said connecting piece.

* * * * *